United States Patent
O'Connor et al.

(10) Patent No.: US 10,260,353 B2
(45) Date of Patent: Apr. 16, 2019

(54) CONTROLLING EXIT SIDE GEOMETRY OF FORMED HOLES

(71) Applicant: Rolls-Royce Corporation, Indianapolis, IN (US)

(72) Inventors: Kurt F. O'Connor, Carmel, IN (US); Matthew T. Kush, Martinsville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 340 days.

(21) Appl. No.: 14/954,543

(22) Filed: Nov. 30, 2015

(65) Prior Publication Data

US 2016/0160655 A1 Jun. 9, 2016

Related U.S. Application Data

(60) Provisional application No. 62/087,568, filed on Dec. 4, 2014.

(51) Int. Cl.
*F01D 5/18* (2006.01)
*B23P 15/04* (2006.01)

(52) U.S. Cl.
CPC .......... *F01D 5/186* (2013.01); *B23P 15/04* (2013.01); *B23P 2700/06* (2013.01); *F05D 2230/10* (2013.01); *F05D 2250/29* (2013.01); *F05D 2260/201* (2013.01); *F05D 2260/202* (2013.01); *Y02T 50/676* (2013.01)

(58) Field of Classification Search
CPC .......... F01D 5/186; F01D 5/187; F01D 5/188; F01D 5/189; F01D 25/08; B23P 15/04; B23P 2700/06; F05D 2230/10; F05D 2250/29; F05D 2260/201; F05D 2260/202; Y02T 50/676
See application file for complete search history.

(56) References Cited

U.S. PATENT DOCUMENTS

| | | | |
|---|---|---|---|
| 5,296,308 A * | 3/1994 | Caccavale | B22C 9/04 164/361 |
| 5,392,515 A * | 2/1995 | Auxier | B23P 15/04 29/463 |
| 5,545,003 A | 8/1996 | O'Connor et al. | |
| 5,779,438 A * | 7/1998 | Wilfert | F01D 5/186 415/115 |
| 6,318,963 B1 * | 11/2001 | Emery | F01D 5/186 416/96 A |
| 7,144,220 B2 | 12/2006 | Marcin, Jr. | |
| 7,311,497 B2 | 12/2007 | Sharma et al. | |
| 7,731,481 B2 | 6/2010 | Cunha et al. | |
| 7,841,083 B2 | 11/2010 | Alaux et al. | |
| 7,871,246 B2 * | 1/2011 | Liang | F01D 5/187 416/97 R |

(Continued)

*Primary Examiner* — Carlos A Rivera
*Assistant Examiner* — Eric J Zamora Alvarez
(74) *Attorney, Agent, or Firm* — Shumaker & Sieffert, P.A.

(57) ABSTRACT

A component includes a structural member and an outer wall covering the structural member with a gap between the outer wall and the structural member. The outer wall includes an array of holes, each of the array of holes extending from an exterior surface of the outer wall to an interior surface of the outer wall. The outer wall includes an array of recesses on the interior surface of the outer wall, each hole in the array of holes terminating within one of the array of recesses of the outer wall.

11 Claims, 7 Drawing Sheets

(56) References Cited

U.S. PATENT DOCUMENTS

| | | | |
|---|---|---|---|
| 7,946,815 B2 * | 5/2011 | Liang | F01D 5/186 |
| | | | 416/97 R |
| 8,615,875 B2 | 12/2013 | Alquier et al. | |
| 2010/0126960 A1 | 5/2010 | Cunha | |
| 2012/0163995 A1 | 6/2012 | Wardle et al. | |

* cited by examiner

FIG. 2A
FIG. 2B

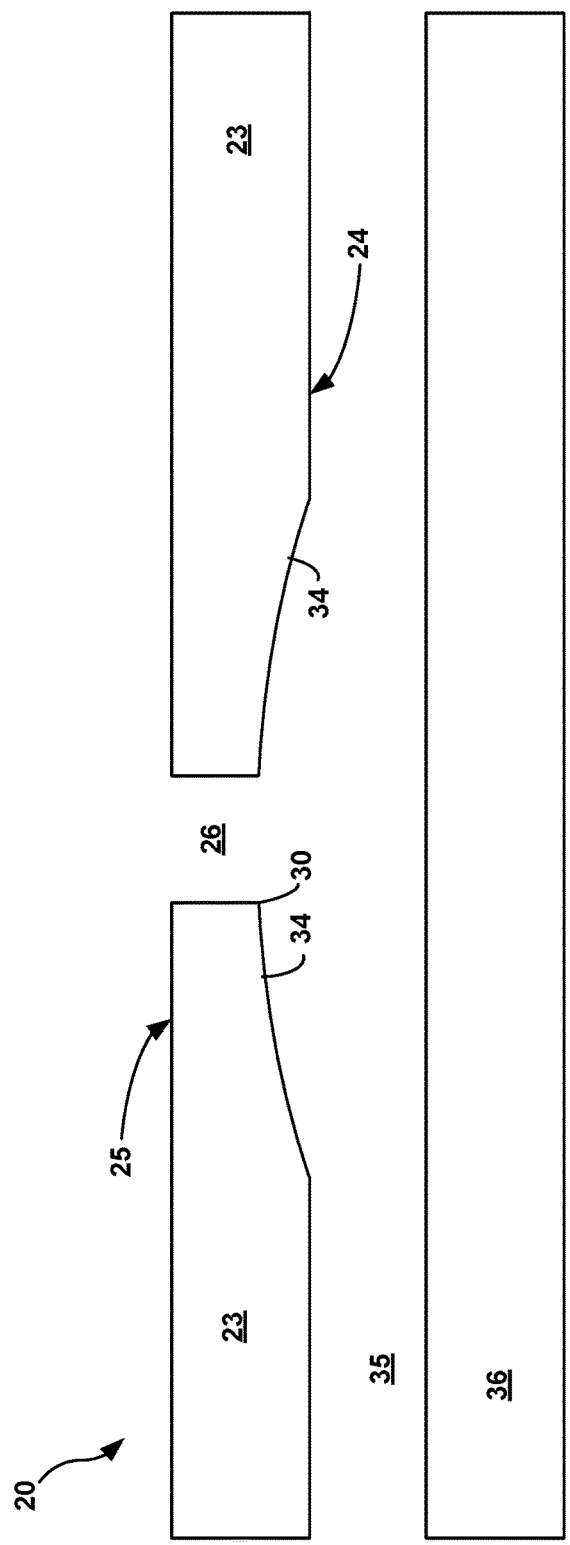

CONTROLLING EXIT SIDE GEOMETRY OF FORMED HOLES

This application claims the benefit of U.S. Provisional Application No. 62/087,568, filed Dec. 4, 2014, which is incorporated herein by reference in its entirety.

TECHNICAL FIELD

The disclosure relates to hole forming, and more particularly, but without limitation, to machined film holes for thin film cooling.

BACKGROUND

Components in a gas turbine engine are often cooled to survive the high temperatures found therein. One method used is thin film cooling by a supply of air, used as a cooling fluid, which is provided to a passage within the component, exiting via cooling holes to form a thin film over the external surface of the component. In addition to removing heat from the component by conduction, the thin film of cooling air serves to prevent hot gas within the gas turbine engine impinging upon the component.

The cooling air used for thin film cooling must be supplied at a pressure greater than the gas path pressure in which the component is operating. This requires work to be carried out on the cooling air, representing a loss of useful power from the engine. In some examples, machining or laser drilling may be used to form films holes having consistent diameters for thin film cooling.

SUMMARY

This disclosure is directed to techniques for design and manufacturing associated with forming shaped or textured holes in a component. The disclosed techniques include forming thin film cooling holes in a dual-wall component such as an airfoil of a gas turbine engine. In one particular example, this disclosure includes metal casting a recess in the interior of the outer wall of the dual-wall component and mechanical drilling a thin film cooling hole through the outer wall of the dual-wall component with the thin film cooling hole terminating within the recess. The disclosed techniques may limit the incidence of a burr on the interior of the outer wall of the dual-wall component from the forming process, particularly for hole drilled at a non-perpendicular angle relative to the interior surface of the outer wall of the dual-wall component. The disclosed techniques further include having an array of recesses on the interior of the outer wall of the dual-wall component for an associated array of thin film cooling holes through the outer wall of the dual-wall component.

In one example, this disclosure is directed to a component comprising a structural member and an outer wall covering the structural member with a gap between the outer wall and the structural member. The outer wall includes an array of holes each of the array of holes extending from an exterior surface of the outer wall to an interior surface of the outer wall. The outer wall includes an array of recesses on the interior surface of the outer wall, each hole in the array of holes terminating within one of the array of recesses of the outer wall.

In another example, this disclosure is directed to a blade airfoil comprising a structural member, and an outer wall covering the structural member with a gap between the outer wall and the structural member. The outer wall includes an array of thin film cooling holes each of the array of holes extending from an exterior surface of the outer wall to an interior surface of the outer wall. The outer wall includes an array of recesses on the interior surface of the outer wall, each hole in the array of holes terminating within one of the array of recesses of the outer wall.

In a further example, this disclosure is directed to a method of manufacturing an array of thin film cooling holes in a component. The method comprises forming the each of the array of holes through an outer wall of the component, the outer wall covering a structural member of the component with a gap between the outer wall and the structural member, each of the array of holes extending from an exterior surface of the outer wall to an interior surface of the outer wall. The outer wall includes an array of recesses on the interior surface of the outer wall, each hole in the array of holes being located to terminate within one of the array of recesses of the outer wall.

The details of one or more examples of this disclosure are set forth in the accompanying drawings and the description below. Other features, objects, and advantages of this disclosure will be apparent from the description and drawings, and from the claims.

BRIEF DESCRIPTION OF DRAWINGS

FIGS. 2A-2C are conceptual illustrations of a dual-wall component including a thin film cooling hole with a relief on the interior of the component to mitigate the chance a burr may form during the forming of the thin film cooling hole.

DETAILED DESCRIPTION

Gas turbine engines are widely used in aircraft propulsion, electric power generation, ship propulsion, and pumps. In gas turbine engine applications, efficiency is a prime objective. In general, improved gas turbine engine efficiency may be obtained by operating at higher temperatures. Indeed, operating temperatures in a turbine section of a gas turbine engine may exceed melting points of superalloy materials used in turbine components. To prevent melting of the engine components, a gas turbine engine airfoil generally incorporates air-cooling discharging through cooling holes. Cooling may be provided by flowing relatively cool air from the compressor section of the engine through passages in the turbine components to be cooled. These passages exhaust some or all of the cooling air through orifices or cooling holes on the surfaces of the airfoil. Further, increasing the amount of cooling benefit obtained from a given amount of cooling air increases the efficiency of the gas turbine engine by limiting the energy consumed by the delivery of the cooling air. Cooling holes may be of a small size and precisely located.

Forming cooling holes may utilize one or more of a variety of techniques in a dual wall component formed by metal casting. For example, forming cooling holes may include mechanical drilling, laser drilling, mechanical stamping, etching, and/or electro-discharge machining (EDM). In some examples, mechanical drilling may be advantageous as mechanical drilling may not form a re-cast layer or heat affected zone around the formed cooling hole.

Figure 1:
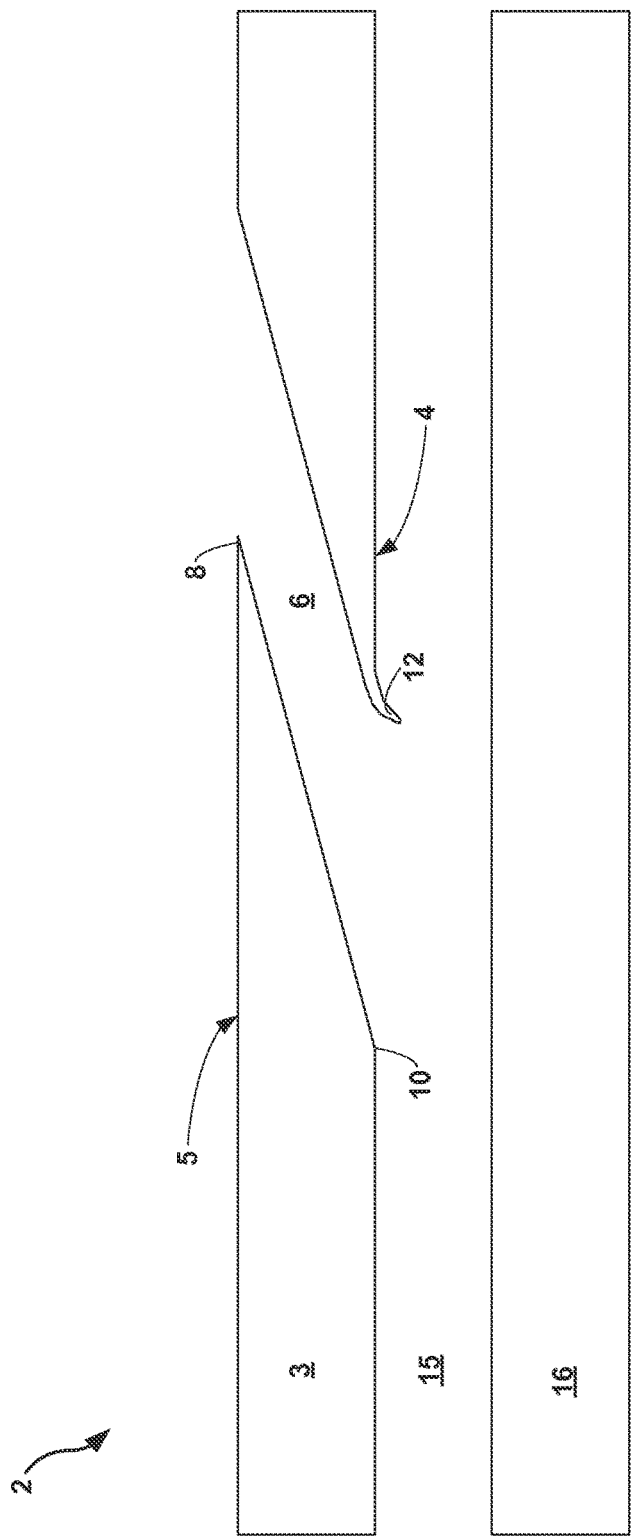
FIG. 1 is a conceptual illustration of a dual-wall component including a thin film cooling hole with a burr on the interior of the component from the forming of the thin film cooling hole.

FIG. 1 is a conceptual illustration of dual wall component 2, which includes outer wall covering 3 and structural member 16 with gap 15 separating outer wall covering 3 and structural member 16. Dual wall component 2 further includes thin film cooling hole 6 formed in outer wall covering 3. While only a single thin film cooling hole 6 is shown in outer wall covering 3, outer wall covering 3 may include an array of substantially similar thin film cooling holes.

Thin film cooling hole 6 forms a passage between external surface 5 of outer wall covering 3 and internal surface 4 of outer wall covering 3. Thin film cooling hole 6 may be formed by a drilling operation or with a consistent angle helical cutting action of a milling bit. While thin film cooling hole 6 is shown with simple geometry, in other examples thin film cooling hole 6 may include more complex geometry, e.g., to improve or control flow through thin film cooling hole 6.

Thin film cooling hole 6 may be formed by, for example, mechanically drilling or other machining from external surface 5 of outer wall covering 3 to internal surface 4 of outer wall covering 3. The resulting thin film cooling hole 6 includes a top edge 8 on external surface 5 of outer wall covering 3 and a bottom edge 10 on internal surface 4 of outer wall covering 3. Bottom edge 10 includes burr 12 from as an undesirable remnant of the forming of thin film cooling hole 6. Burr 12 may restrict fluid flow through gap 15 and thin film cooling hole 6, limiting the efficiency of thin film cooling of dual wall component 2. Perhaps more detrimentally, burr 12 may also break off during use of dual wall component 2.

For this reason, it may be advantageous to remove burr 12 following the forming of thin film cooling hole 6. However, removal of metal on the exit side of the hole from the drilling process requires additional processing time. In addition, the design of dual wall component 2 may limit physical access for tooling to gap 15, thereby making removal of burr 12 very difficult.

FIG. 2A is a conceptual illustration of dual wall component 20 prior to the formation of thin film cooling hole 26. Dual wall component 20 includes outer wall covering 23 and structural member 36 with gap 35 separating outer wall covering 23 and structural member 36. In some examples, gap 35 may be no greater than about 0.10 inches. As illustrated in FIG. 2A, dual wall component 20 may be formed using an investment metal casting process in which outer wall covering 23 and structural member 36 are formed as part of a unitary metal casting. In other examples, dual wall component 20 may be formed with additive manufacturing techniques, sheet metal stamping plastic injection, metal injection, or combinations thereof.

The design of component 20 may limit physical access for tooling to gap 35.

FIG. 2B is a conceptual illustration of dual wall component 20, and includes thin film cooling hole 26. Thin film cooling hole 26 is formed in outer wall covering 23. Dual wall component 20 is substantially similar to dual wall component 2 with the addition of recess 34 on interior surface 24 of outer wall covering 23. While only a single thin film cooling hole 26 is shown in outer wall covering 23, outer wall covering 23 may include an array of substantially similar thin film cooling holes.

Thin film cooling hole 26 forms a passage between external surface 25 of outer wall covering 23 and internal surface 24 of outer wall covering 23. As shown, thin film cooling hole 26 is at a non-perpendicular angle to external surface 25 and internal surface 24 of outer wall covering 23. In some examples, thin film cooling hole 26 may be at angle between about 90 degrees (perpendicular) and about 10 degrees to external surface 25 and/or internal surface 24 of outer wall covering 23. In some particular examples, thin film cooling hole 26 may be at angle of less than 75 degrees, such as an angle of about 10 degrees, of about 15 degrees or of about 30 degrees to external surface 25 of outer wall covering 23. In other examples, as shown in FIG. 2C, thin film cooling hole 26 may be substantially perpendicular to external surface 25 of outer wall covering 23. While thin film cooling hole 26 may be one of an array of thin film cooling holes in outer wall covering 23, different thin film cooling holes in the array may be of various diameters and angles to external surface 25 of outer wall covering 23, or each of the thin film cooling holes in the array may be of substantially similar diameter and/or angle relative to external surface 25 of outer wall covering 23. Thin film cooling hole 26 may be formed by a drilling operation or with a consistent angle helical cutting action of a milling bit. While thin film cooling hole 26 is shown with simple geometry, in other examples thin film cooling hole 26 may include more complex geometry, e.g., to improve or control flow through thin film cooling hole 26. For example, thin film cooling hole 26 may include a conical shape, an oval shape, a circular shape, a star shape, a square shape, or any other suitable shape.

Thin film cooling hole 26 may be formed by, for example, mechanically drilling or other machining from external surface 25 of outer wall covering 23 to internal surface 24 of outer wall covering 23. The resulting thin film cooling hole 26 includes a top edge 28 on external surface 25 of outer wall covering 23 and a bottom edge 30 on internal surface 24 of outer wall covering 23. Thin film cooling hole 26 terminates within recess 34 of outer wall covering 23. As one example, recess 34 may have a radius of between about 0.20 inches to about 0.02 inches, such as a radius of about 0.10 inches or about 0.050 inches. Due to the increased angle between the surface of recess 34 and thin film cooling hole 26, as compared to the angle between external surface 25 and/or internal surface 24 of outer wall covering 23, outer wall covering 23 adjacent to thin film cooling hole 26 is less likely to include a burr like burr 12 (FIG. 1). In this manner, recess 34 may improve the characteristic of thin film cooling hole 26 as compared to thin film cooling hole 6 of FIG. 1. In addition, recess 34 may improve the cooling flow characteristics through thin film cooling hole 26, by, for example, providing for less turbulent flow.

In other examples, recess 34 and other recesses within an array of recesses may have more complex geometries, some of which may increase turbulent flow of cooling fluid in recess 34. For example, recess 34 may have a shape or texture to enhance thermal transfer properties. As another example, recess 34 may include spiral shaped veins to create a spiraling flow through thin film cooling hole 26.

Component 20 may include an array of thin film cooling holes, including thin film cooling hole 26. Likewise, component 20 may include an array of recesses on interior surface 24 of outer covering 23, including recess 34. Each cooling hole in the array of thin film cooling holes may terminate in one recess of the array of recesses on interior surface 24 of outer covering 23.

In some examples, component 20 may be formed from a nickel super alloy. For example, component 20 may be formed using a metal casting process. In one particular example, the geometry of gap 35, including recess 34 may be formed using a core material that is later dissolved or otherwise removed following the metal casting process used to form outer wall covering 23 and structural member 36. The core material may include, for example, a ceramic, quartz, or the like. In this manner, creating recess 34 may simply involve including a corresponding bump on the core material of the metal casting process. In examples in which component 20 includes an array of thin film cooling holes, each of the cooling holes in the array may terminate within a corresponding recess on the internal surface 24 of outer wall covering 23. The addition of an array of bumps on the core material of the metal casting process may even benefit an investment casting process by mitigation of a problem of a core material adhering to a flat, smooth surface. In addition, the multiple small bumps may act as anchors that lock the investment casting core to the component surface.

As previously mentioned, component 20 may represent a blade airfoil configured for use in a gas turbine engine, or other component in which thin film cooling is desirable. In some examples, thin film cooling hole 26 may be formed from component 20 using high speed machining with coated carbide cutters. In some examples, such cutters may have diameters between about 0.4 millimeters (mm) and 1.0 mm. In the same or different example, thin film cooling hole 26 may have a diameter of about 0.012 inches to about 0.060 inches, such as a diameter of about 0.015 inches. Outer wall covering 23 in component 20 may range in thickness from about 0.014 inches to about 0.30 inches, such as a thickness of about 0.020 inches or about 0.030 inches.

Figure 3:
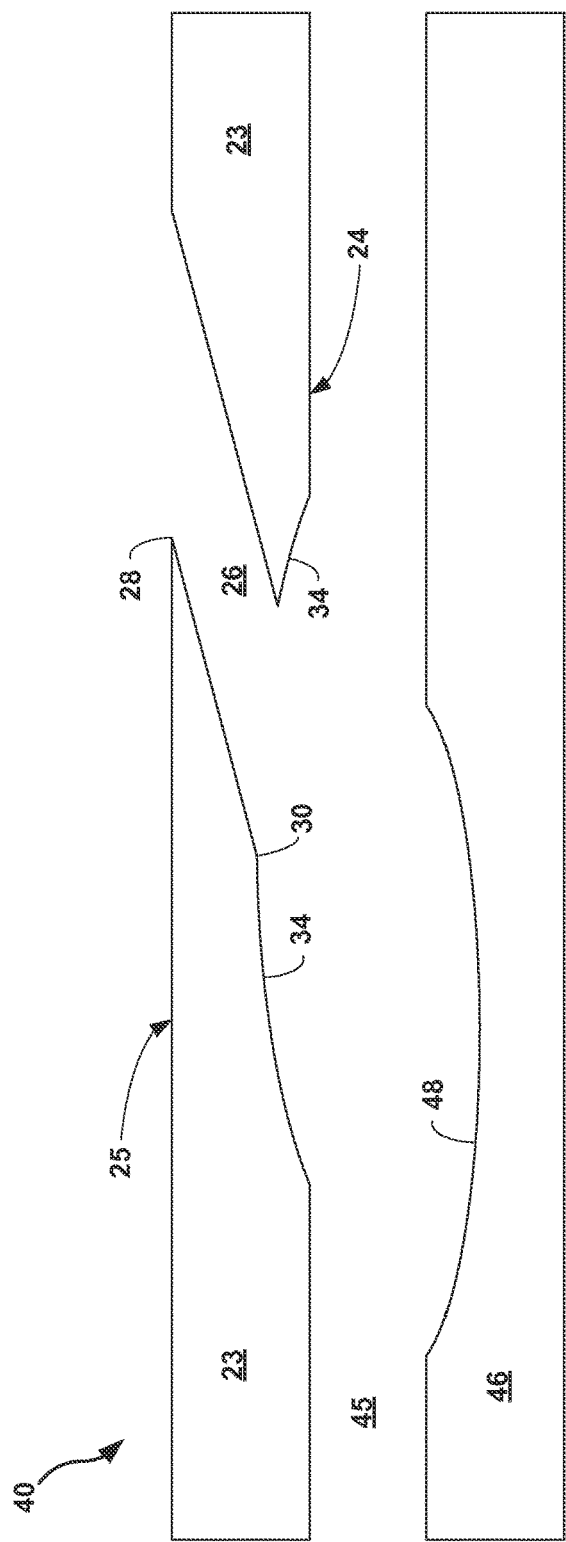
FIG. 3 is a conceptual illustrations of a dual-wall component including a thin film cooling hole with a relief on the interior of the component to mitigate the chance a burr may form during the forming of the thin film cooling hole and another relief on an opposing wall of the component to increase clearance during forming of the thin film cooling hole.

FIG. 3 is a conceptual illustration of dual wall component 40, and includes thin film cooling hole 26. Dual wall component 40 includes outer wall covering 23 and structural member 46 with gap 45 separating outer wall covering 23 and structural member 46. Thin film cooling hole 26 is formed in outer wall covering 23. Dual wall component 40 is substantially similar to dual wall component 20 with the addition of recess 48 on structural member 46 opposite thin film cooling hole 26, and like numbered elements illustrated in FIG. 3 may be considered to be substantially similar to the corresponding elements illustrated in FIG. 2B. While only a single thin film cooling hole 26 is shown in outer wall covering 23, outer wall covering 23 may include an array of substantially similar thin film cooling holes.

In some examples, gap 45 may be no greater than about 0.10 inches. Recess 48 on structural member 46 opposite thin film cooling hole 26 increases clearance for tooling used to form thin film cooling hole 26. In this manner, the risk of an unwanted strike of structural member 46 during forming of thin film cooling hole 26 is reduced. In addition, in examples with a steep angle between thin film cooling hole 26 and outer wall covering 23, the diameter of the machining bit, the angle between thin film cooling hole 26 and outer wall covering 23 and the distance of gap 45 may require the clearance provided by recess 48 to prevent striking structural member 46 during forming of thin film cooling hole 26. In examples in which component 40 includes an array of thin film cooling holes, structural member 46 may include a corresponding array of recesses, such as recess 48, an a central axis of each thin film cooling holes in the array of thin film cooling holes may intersecting one of the array of recesses of structural member 46. In this way, in examples with a steep angle between thin film cooling hole 26 and outer wall covering 23, recess 48 may allow use of a larger diameter bit, may allow the machining bit to travel deeper relative to outer wall covering 23 without striking structural member 46, or both.

In some examples, component 40 may be formed from a nickel super alloy. In some examples, component 40, or at least structural member 46 may be formed of a single crystal alloy. For example, component 40 may be formed using a metal casting process. In one particular example, the geometry of gap 45, including recess 34 and recess 48 may be formed using a core material that is later dissolved following the metal casting process used to form outer wall covering 23 and structural member 46. In this manner, creating recess 34 and recess 48 may simply involve including a corresponding bump on the core material of the metal casting process. In examples in which component 40 includes an array of thin film cooling holes, each of the cooling holes in the array may terminate within a corresponding recess on the internal surface 24 of outer wall covering 23. As with component 20, component 40 may represent a blade airfoil configured for use in a gas turbine engine, or other component in which thin film cooling is desirable.

Various techniques of this disclosure may provide one or more advantages. For example, the design of outer wall covering 23, including recess 34 may limit the formation of undesirable burs. Further limiting the thickness of outer wall covering 23 at recess 34 may limit the cycle time required to form thin film cooling hole 26, and increase the life of machine tooling, such as drill bits used to machine thin film cooling hole 26 by reducing the amount of material that must be removed to form thin film cooling hole 26. For example, the design of component 40, including recess 48, may limit the incidence of back strike hits on the surface of structural member 46. Furthermore, the design of outer wall covering 23 and/or structural member 46 may increase casting yields by creating a surface that is less prone to mold buckle or shell swell. Finally, the techniques disclosed herein provide opportunities to better control flow through thin film cooling holes by controlling the geometry of thin film cooling holes on the interior of a component, and may allow component designs that improve cooling plenums.

Figure 4A:
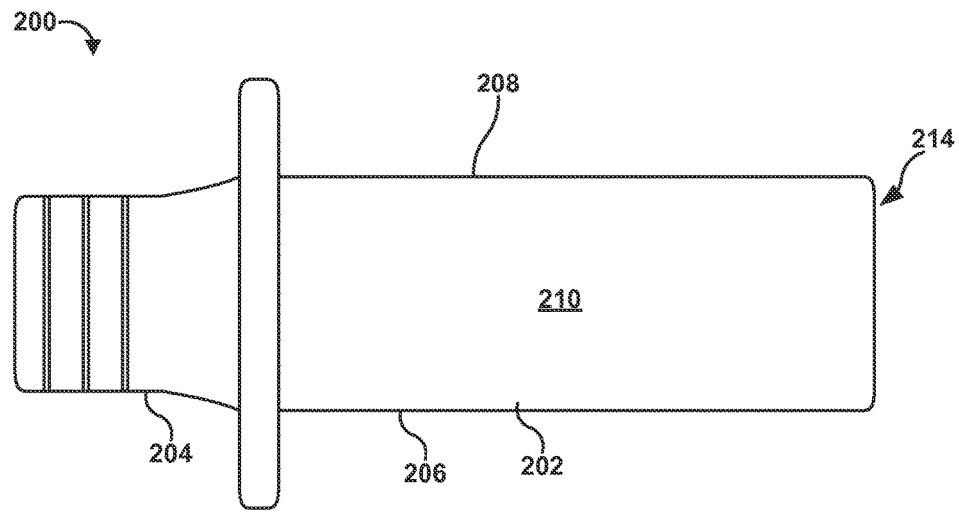
FIGS. 4A-4C are conceptual diagrams of an example blade airfoil configured for use in a gas turbine engine, the airfoil including thin film cooling holes as disclosed herein.
Figure 4B:
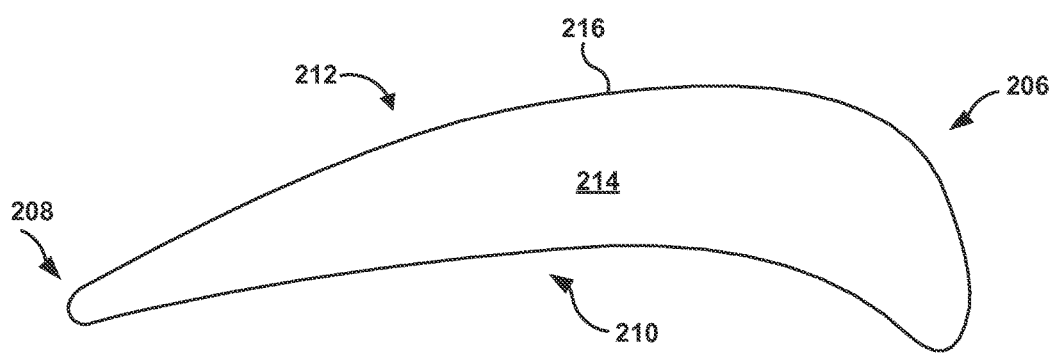
Figure 4C:
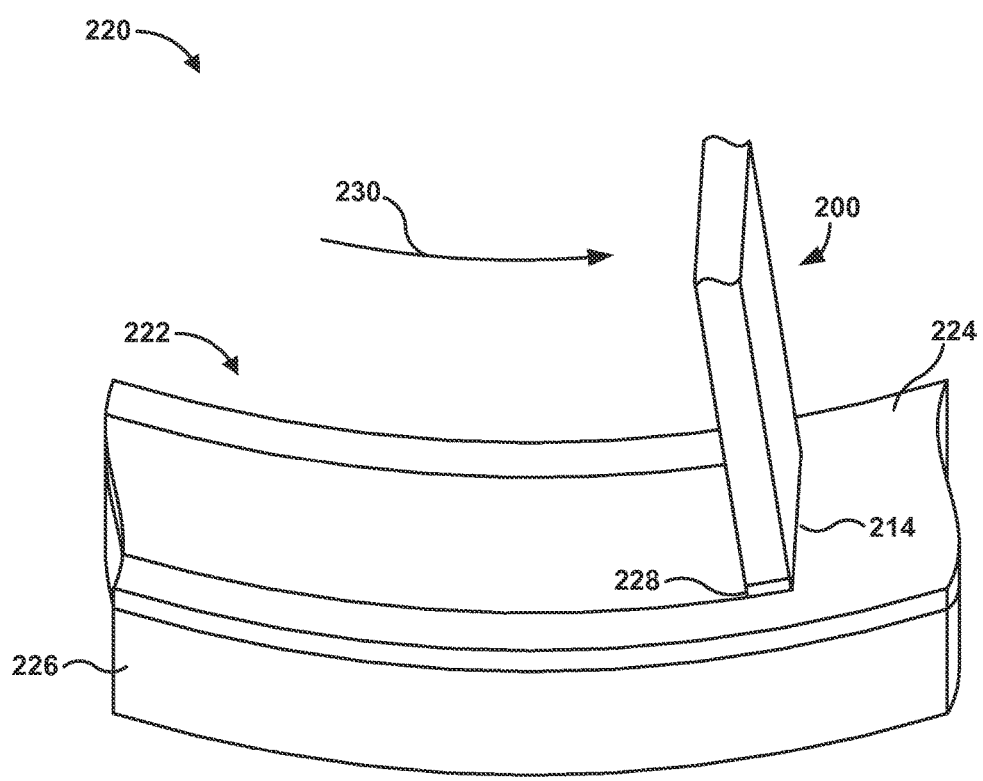

FIGS. 4A-4C illustrate different views of an example blade 200 which may include features and arrays of features, such as thin film cooling holes, according to an example of the disclosure. Blade 200 generally includes airfoil 202 attached to stalk 204. Airfoil 202 includes a leading edge 206, a trailing edge 208, a pressure sidewall 210, and a suction sidewall 212. Pressure sidewall 210 is connected to suction sidewall 212 at leading edge 206 and trailing edge 208. Further, blade 200 defines blade tip 214, which is a surface substantially orthogonal to leading edge 206. Blade tip 214 is defined by an edge 216 that extends about the perimeter of the surface of blade tip 214, and separates the surface of blade tip 214 from the adjacent surface of airfoil 202. Leading edge 206, trailing edge 208, pressure sidewall 210, and suction side wall 212 generally extend from stalk 204 to edge 216.

In general, blade 200 is a component of a mechanical system including, e.g., a gas turbine engine. In different examples, blade 200 may be a compressor blade that imparts kinetic energy into a fluid or a turbine blade that extracts kinetic energy from a moving fluid. FIG. 4C is a conceptual diagram of an example gas turbine engine 220 with blade 200. Gas turbine engine 220 includes blade track or blade shroud 222, which is defined into a surface 224 of a turbine substrate 226. Blade 200 is shown with a tip coating 228, which is described in greater detail below, deposited on blade tip 214. Although a single blade 200 is shown in gas turbine engine 220 for ease of description, in actual operation, gas turbine engine 220 may include a plurality of blades.

During operation of gas turbine engine 220, blade 200 rotates relative to blade track 222 in a direction indicated by arrow 230. In general, the power and efficiency of gas turbine engine 220 can be increased by reducing the gap blade track 222 and blade 200, e.g., to reduce or eliminate gas leakage around blade 200. Thus, gas turbine engine 220, in various examples, is configured to allow blade 200 to abrade into surface 224 of turbine substrate 226, thereby defining blade track 222, which creates a seal between blade track 222 and blade 200. The abrading action may create high thermal and shear stress forces at blade tip 214. In addition, occasional movement of blade tip 214 relative to turbine substrate 226 during the operation of gas turbine engine 222 may cause blade tip 214 to impinge on turbine substrate 226, creating high shear forces at blade tip 214.

To protect against the various forces acting on blade 200 and, in particular, blade tip 214, one or more protective layers may be provided on blade 200 and/or blade tip 214. For example, a tip coating 228, may be provided on blade tip 214 to improve different properties of an underlying blade surface including, e.g., wear, corrosion, hardness, and/or temperature resistance properties of an underlying blade surface. Additionally or alternatively, a protective coating may be applied to an entire airfoil 202, including blade tip 214, to improve different properties of an underlying blade surface. In some examples, airfoil 202 may receive a coating that reduces or substantially eliminates the effects of oxidation or corrosion on airfoil 202. Regardless of the specific number or specific type of coatings applied to blade 200, in some examples, blade 200 may benefit from the features and arrays of features, such as an array of thin film cooling holes, described in the disclosure.

An airfoil, such as blade 200, may include additional features, which may be formed in conjunction with the forming of thin film cooling holes to further reduce the cycle time required to for the blade airfoil. For example, forming a blade airfoil, such as blade 200, may include gating removal and/or throat machining at the leading edge of the blade airfoil. As another example, forming to produce a blade airfoil 240 may include hole drilling along the trailing edge of the blade airfoil. As further examples, forming a blade airfoil may also include slash face along fore and aft faces and/or tip cap finishing. Each of these processes may be implemented in combination with forming thin film cooling holes to limit the cycle time required to form a blade airfoil, e.g., by only needing to determine the position of the blade airfoil once and forming each of these features while the blade airfoil is held in the same position. In addition, more than one feature may potentially be formed simultaneously on blade airfoil to further reduce cycle time.

Figure 5:
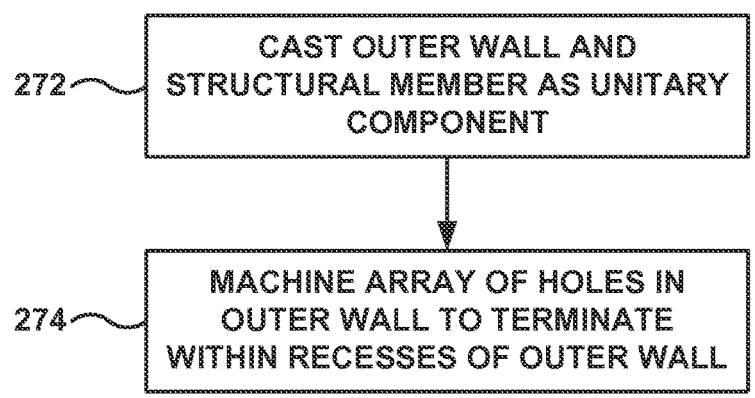
FIG. 5 is a flowchart illustrating example techniques for forming thin film cooling holes in a dual-wall component.

FIG. 5 is a flowchart illustrating example techniques for forming an array of thin film cooling holes in a dual-wall component, such as blade airfoil 240. For clarity, the techniques of FIG. 5 are described with respect to dual wall component 40 of FIG. 3.

First, outer wall covering 23 and structural member 46 are formed as a unitary component by metal casting (272). The metal casting may include locating a core material within a casting mold, the core material including protuberances shaped to form the array of recesses in the interior surface of the outer wall as a result of the casting, filling the casting mold with a molten metal, and after the molten metal solidifies to produce the component, dissolving the core material to produce an internal passageway within the component, the internal passageway including gap 45. The core material may include, for example, a ceramic, quartz, or the like. Gap 45 may be no greater than about 0.10 inches. In some examples, the core material includes additional protuberances shaped to form an array of recesses, including recess 48, on the surface of structural member 46.

Next, following the formation of outer wall covering 23 and structural member 46, an array of holes, including hole 26 is formed through outer wall 23, each of the array of holes extending from an exterior surface of the outer wall to an interior surface of the outer wall (274). Outer wall 23 includes an array of recesses, including recess 34, on interior surface 24, each hole in the array of holes being located to terminate within one of the array of recesses of outer wall 23. In examples in which the surface of structural member 46 includes an array of recesses, including recess 48, a central axis of each hole in the array of holes intersects one of the array of recesses of structural member 46. Following the forming of the array of holes in outer wall 23, interior surface 24 of outer wall 23 may be characterized by an absence of burrs on edges of each of the array of holes, including edge 30 of hole 26.

Although the foregoing has been primarily described with reference to gas turbine engine components, in other examples, the technique described herein may be used to form components used in other systems, such as any temperature management component (e.g., a heat exchanger, a cooling component, or the like). For example, techniques described herein may be used to form components used in cooling industries, batteries, including lithium-ion batteries, energy storage systems, or the like.

Various examples of this disclosure have been described. These and other examples are within the scope of the following claims.

What is claimed is:

1. A component comprising:
a unitary metal casting comprising:
a structural member; and
an outer wall covering the structural member with a gap between the outer wall and the structural member;
wherein the outer wall includes an array of holes, each of the array of holes extending from an exterior surface of the outer wall to an interior surface of the outer wall,
wherein the outer wall includes an array of recesses defined in the interior surface of the outer wall, each hole in the array of holes terminating within a curved portion of one of the array of recesses of the outer wall,
wherein portions of the outer wall including the recesses define a thickness less than adjacent portions of the outer wall that do not include a recess,
wherein each recess in the array of recesses comprises a substantially constant radius of curvature between about 0.02 inches and about 0.20 inches,
wherein the structural member includes an array of recesses defined in a surface of the structural member that faces the interior surface of the outer wall,
wherein a respective central axis of each respective hole of the array of holes forms a non-perpendicular angle less than 75 degrees relative to the exterior surface of the outer wall,
wherein each respective recesses of the array of recesses of the structural member is laterally offset from a corresponding recess of the array of recesses of the outer wall such that the respective central axis of each respective hole in the array of holes intersects a corresponding recess of the array of recesses of the structural member, and wherein portions of the structural member including the recesses define a thickness less than adjacent portions of the structural member that do not include a recess.

2. The component of claim 1, wherein a design of the component limits physical access for tooling to the gap between the outer wall and the structural member.

3. The component of claim 1, wherein the interior surface of the outer wall is characterized by an absence of burrs on edges of each hole of the array of holes.

4. The component of claim 1, wherein the gap between the outer wall and the structural member is no greater than about 0.10 inches.

5. The component of claim 1, wherein the component is a temperature management component.

6. A blade airfoil comprising:
a unitary metal casting comprising:
a structural member; and
an outer wall covering the structural member with a gap between the outer wall and the structural member;
wherein the outer wall includes an array of thin film cooling holes, each of the array of thin film cooling holes extending from an exterior surface of the outer wall to an interior surface of the outer wall,
wherein the outer wall includes an array of recesses in the interior surface of the outer wall, each hole in the array of thin film cooling holes terminating within a curved portion of one of the array of recesses of the outer wall,
wherein portions of the outer wall including the recesses define a thickness less than adjacent portions of the outer wall that do not include a recess,
wherein the structural member includes an array of recesses defined in a surface of the structural member that faces the interior surface of the outer wall,
wherein a respective central axis of each respective thin film cooling hole of the array of thin film cooling holes forms a non-perpendicular angle less than 75 degrees relative to the exterior surface of the outer wall,
wherein each respective recesses of the array of recesses of the structural member is laterally offset from a corresponding recess of the array of recesses of the outer wall such that the respective central axis of each respective thin film cooling hole in the array of thin film cooling holes intersects a corresponding recess of the array of recesses of the structural member, and
wherein portions of the structural member including the recesses define a thickness less than adjacent portions of the structural member that do not include a recess.

7. The blade airfoil of claim 6, wherein the interior surface of the outer wall is characterized by an absence of burrs on edges of each thin film cooling hole of the array of thin film cooling holes.

8. The blade airfoil of claim 6, wherein the gap between the outer wall and the structural member is no greater than about 0.10 inches.

9. A method of manufacturing an array of thin film cooling holes in a component, the method comprising:

metal casting an outer wall and a structural member as a unitary component with a gap between the outer wall and the structural member, wherein the outer wall includes an array of recesses defined in the interior surface of the outer wall, wherein portions of the outer wall including the recesses define a thickness less than adjacent portions of the outer wall that do not include a recess, and wherein each recess in the array of recesses comprises a substantially constant radius of curvature between about 0.02 inches and about 0.20 inches; and forming each thin film cooling hole of the array of thin film cooling holes through the outer wall of the component, each of the array of thin film cooling holes extending from an exterior surface of the outer wall to an interior surface of the outer wall, wherein each thin film cooling hole in the array of thin film cooling holes terminates within a curved portion of one of the array of recesses of the outer wall, wherein the structural member includes an array of recesses defined in a surface of the structural member that faces the interior surface of the outer wall, wherein a respective central axis of each respective thin film cooling hole of the array of thin film cooling holes forms a non-perpendicular angle less than 75 degrees relative to the exterior surface of the outer wall, wherein each respective recesses of the array of recesses of the structural member is laterally offset from a corresponding recess of the array of recesses of the outer wall such that the respective central axis of each respective thin film cooling hole in the array of thin film cooling holes intersects a corresponding recess of the array of recesses of the structural member, and wherein portions of the structural member including the recesses define a thickness less than adjacent portions of the structural member that do not include a recess.

10. The method of claim 9, wherein metal casting the outer wall and the structural member as a unitary component includes:

locating a core material within a casting mold, the core material including protuberances shaped to form the array of recesses in the interior surface of the outer wall as a result of the casting;

filling the casting mold with a molten metal;

after the molten metal solidifies to produce the component, dissolving the core material to produce an internal passageway within the component, the internal passageway including the gap between the outer wall and the structural member.

11. The method of claim 10, wherein the core material includes additional protuberances shaped to form the array of recesses in the surface of the structural member that faces the interior surface of the outer wall.

* * * * *